United States Patent [19]
Clare et al.

[11] Patent Number: 6,122,125
[45] Date of Patent: Sep. 19, 2000

[54] HEAD SELECTABLE SERVO NOTCH FILTER AND METHOD FOR IMPROVING SERVO SYSTEM PERFORMANCE

[75] Inventors: Donald Lee Clare, Morgan Hill; Gregory Michael Frees, Los Alto; Louis Joseph Serrano, San Jose, all of Calif.

[73] Assignee: International Business Machines Corporation, Armonk, N.Y.

[21] Appl. No.: 08/919,857

[22] Filed: Aug. 28, 1997

[51] Int. Cl.[7] ................................................... G11B 5/035
[52] U.S. Cl. .................................................. 360/65; 360/61
[58] Field of Search .................................... 360/75, 78.09, 360/77.08, 77.04, 77.02, 78.04, 78.06, 61, 65, 66; 318/611, 615, 603, 617, 619, 622, 623, 652, 667, 561; 369/32, 44.27, 44.28, 44.29; 455/339; 333/167

[56] References Cited

U.S. PATENT DOCUMENTS

| | | |
|---|---|---|
| 4,786,990 | 11/1988 | Overton et al. . |
| 4,963,806 | 10/1990 | Shinohara et al. . |
| 5,032,776 | 7/1991 | Garagnon . |
| 5,155,422 | 10/1992 | Sidman et al. . |
| 5,325,247 | 6/1994 | Ehrlich et al. . |
| 5,369,345 | 11/1994 | Phan et al. . |
| 5,426,545 | 6/1995 | Sidman et al. . |
| 5,459,383 | 10/1995 | Sidman et al. . |
| 5,465,183 | 11/1995 | Hattori . |
| 5,719,326 | 2/1998 | Vulih et al. ............................ 73/35.07 |

FOREIGN PATENT DOCUMENTS

| | | |
|---|---|---|
| 6-96538 | 4/1994 | Japan . |
| 6-195855 | 7/1994 | Japan . |

OTHER PUBLICATIONS

Fiechtner et al., "Automated Custom Tuning Servo System For Hard File Manufacturing," *IBM Technical Disclosure Bulletin*, vol. 32, No. 8B, pp. 346–347 (Jan. 1990).

Palmer, "Automatic Notch Frequency Control for Servo Stabilization," *IBM Technical Disclosure Bulletin*, vol. 19, No. 10, pp. 3860–3862 (Mar. 1977).

*Primary Examiner*—Andrew L. Sniezek
*Attorney, Agent, or Firm*—Altera Law Group, LLC

[57] ABSTRACT

A notch filter for a disk drive servo system is disclosed having selectable filtering capability. Different servo notch filters for different heads in the actuator head stack are provided. The notch filters may be selected to remove different resonant modes associated with the different disk drive heads. Each of the plurality of notch filters is tuned to remove a resonant frequency associated with at least one magnetic head of the disk drive. In operation, a notch filter is selected to remove a resonant frequency associated with a magnetic head commanded to write or read data to or from the disk drive. The notch filter system includes a multiplexor for controlling the selection of the notch filters. The multiplexor receives commands from a servo processor to control the selection of a notch filter. Different notch filters can be utilized, including series tapped notch filters or parallel notch filters. The notch filters are run continuously to avoid transients resulting from initialization of the notch filters.

18 Claims, 4 Drawing Sheets

HEAD SELECTABLE SERVO NOTCH FILTER AND METHOD FOR IMPROVING SERVO SYSTEM PERFORMANCE

BACKGROUND OF THE INVENTION

1. Field of the Invention

This invention relates in general to servo systems, and more particularly to a notch filter for a disk drive servo system having selectable filtering capability.

2. Description of Related Art

In recent years microcomputer equipment such as personal or desk top computers have become extremely popular for a wide range of business, educational, recreational and other uses. Such computers typically include a main central processor having one or more memory storage disks for storage of data. The storage disk or disks are commonly provided as part of a so-called Winchester disk drive unit, sometimes referred to as a "hard" disk, wherein the storage disks are rotatably supported within a substantially sealed housing. The disks are rotatably driven in unison by a small spindle motor, and one or more electromagnetic heads are displaced by a head actuator assembly to traverse surfaces of the disks for purposes of reading and writing data. Such data is recorded onto magnetizable surfaces or surface films of the disks in the form of data bits located within narrow, closely spaced concentric tracks on the disks. Accordingly, for any given disk drive unit, the total memory storage capacity is directly proportional to the number of disks as well as the number of tracks on each disk.

In normal operations, a system controller of the main central processor has the capability to identify data stored by recording on the disks, typically through the use of directory name, file, name, and/or track address information. When reading of data at a specified data track is desired, the system controller displaces the head or heads to the desired position by supplying appropriate command signals to operate the head actuator assembly. Alternately, when data recording or writing is desired, the system controller operates the actuator assembly to align a selected head with a vacant data track. In either case, the head actuator assembly is commanded to displace the head or heads through a generally radial path relative to the disk for moving each head from alignment with a previously selected track to alignment with the newly selected destination track. Such movement of the head is normally referred to as a "seek" step.

Servo positioning systems have been widely employed for quickly and accurately positioning the mechanical element, such as a magnetic head of a magnetic recording disk apparatus. A typical servo control system for a recording disk apparatus includes a controller for generating a velocity signal based upon a position signal obtained from a servo signal generated by a magnetic head.

The position signal indicates the radial position of the magnetic head relative to the adjacent track and is generally designed to be zero when the head is at the center of a track being traced. The controller calculates the number of tracks needed to be jumped according to command from a host processor unit.

Every servo actuator structure manifests a mechanical resonance at some frequency or frequencies. These vibrational modes, unless accounted for in the servo control design, can result in servo control loop instabilities. Accordingly, the signal from a controller is passed through a notch filter. Typically, a notch filter has an attenuation characteristic such that the attenuation is maximum at the mechanical resonant frequency $f_0$ thereby filtering out any resonances in the actuator structure in order to stabilize the servo control loop.

It is known that in a discrete time domain (sampling) system, the system control transfer function manifests a minimum value at the sampling frequency. This characteristic has been proposed for use as a notch filter function in a head position servo control loop in order to filter out head actuator resonance, see, e.g., Bauck U.S. Pat. No. 4,398,228 entitled "Method of Avoiding Resonance in Servo Controlled Apparatus". One apparent drawback of this approach is that the sampling frequency must be chosen strictly in relation to the mechanical resonance of the actuator. Such a selection may not be optimum, given other design constraints. For example, when the actuator structure is varied, as by changing the number of disks/heads in the drive, a different sampling frequency and different overall servo control loop design would be required, even within the same product family design. Another inherent drawback is the inability of the Bauck servo loop to sense and respond to e.g. seek arrival transients occurring at the sample frequency and resulting in off-track data writing operations.

The above-described structural dynamics of the actuator can cause servo performance degradation in settle time and random transient vibration (RTV). The dynamics can also cause servo/mechanical instability, which leads to complete performance failure. Often, the dynamics of the actuator is different, but predictable, on different heads in the arm stack due to the vibration mode shape. This causes dynamics problems at different frequencies (different vibration modes) on different heads in the stack.

The mode shapes and frequencies of the various arm "scissor" modes (in-plane bending modes of the arms) can be analyzed to identify the dominant modes. Typically, the dominant modes are in the frequency range of 4–5 kHz. These modes have distinct shapes that cause large vibration motion of some heads and very little motion on others. For example, the "end arm mode" has large motions on the top-most and bottom-most heads in a disk stack for a disk drive having multiple disks. The end arm mode may be higher in frequency than the dominant modes for the inner arms, and the end arms may have no motion at the dominant modes for the inner arms.

Therefore, a single servo notch filter may not be able to improve the performance on all heads. It is also known that a servo notch filter designed to fix a particular mode on a particular head, may cause performance degradation on other heads in the arm stack which have different dynamic characteristics. Further, using a single broad notch in a filter to remove both modes may not work if the frequencies are too different, since a broad notch may adversely effect servo performance.

It can be seen then that there is a need to utilize different servo notch filters for different heads in the actuator head stack.

It can also be seen then that there is a need for a disk drive servo having different notch filters for different heads in the stack.

It can also be seen that there is a need for a disk drive servo that uses one servo notch filter to remove the modes for the internal heads in the stack and a different notch filter for removing the modes for the end heads.

SUMMARY OF THE INVENTION

To overcome the limitations in the prior art described above, and to overcome other limitations that will become apparent upon reading and understanding the present specification, the present invention discloses a notch filter for a disk drive servo system having selectable filtering capability.

The present invention solves the above-described problems by providing different servo notch filters for different heads in the actuator head stack. The notch filters may be selected to remove different resonant modes associated with the different disk drive heads.

A system in accordance with the principles of the present invention includes a notch filter system for a servo controller of a disk drive, wherein the notch filter system comprises a plurality of selectable notch filters. Each of the plurality of notch filters is tuned to remove a resonant frequency associated with at least one magnetic head of the disk drive. In operation, a notch filter is selected to remove a resonant frequency associated with a magnetic head commanded to write or read data to or from the disk drive.

Other embodiments of a system in accordance with the principles of the invention may include alternative or optional additional aspects. One such aspect of the present invention is that the notch filter system includes a multiplexor for receiving output signals from the plurality of notch filters, the multiplexor receiving commands from a servo processor to control the selection of a notch filter.

Another aspect of the present invention is that the plurality of notch filters comprises a series of N notch filters, the series of N notch filters providing an output from an output of the Nth notch filter and at least one output from a tap of an output of at least one of the N−1 filters.

Another aspect of the present invention is that the multiplexor receives as inputs the output of the Nth notch filter and the at least one output from a tap of an output of at least one of the N−1 notch filters, and receives commands from a servo processor to control the selection of the inputs.

Still another aspect of the present invention is that the plurality of notch filters comprises a plurality of parallel notch filters, each of the parallel notch filters receiving an input signal and generating an output signal, the output signals being selected to remove the resonant frequency associated with the magnetic head commanded to write or read data to or from the disk drive.

Another aspect of the present invention is that the multiplexor receives as inputs the output of the parallel notch filters and commands from a servo processor to control the selection of the inputs.

Another aspect of the present invention is that the notch filters are run continuously.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides different servo notch filters to different heads in the actuator head stack to remove different resonant modes associated with different disk drive heads.

Figure 1:
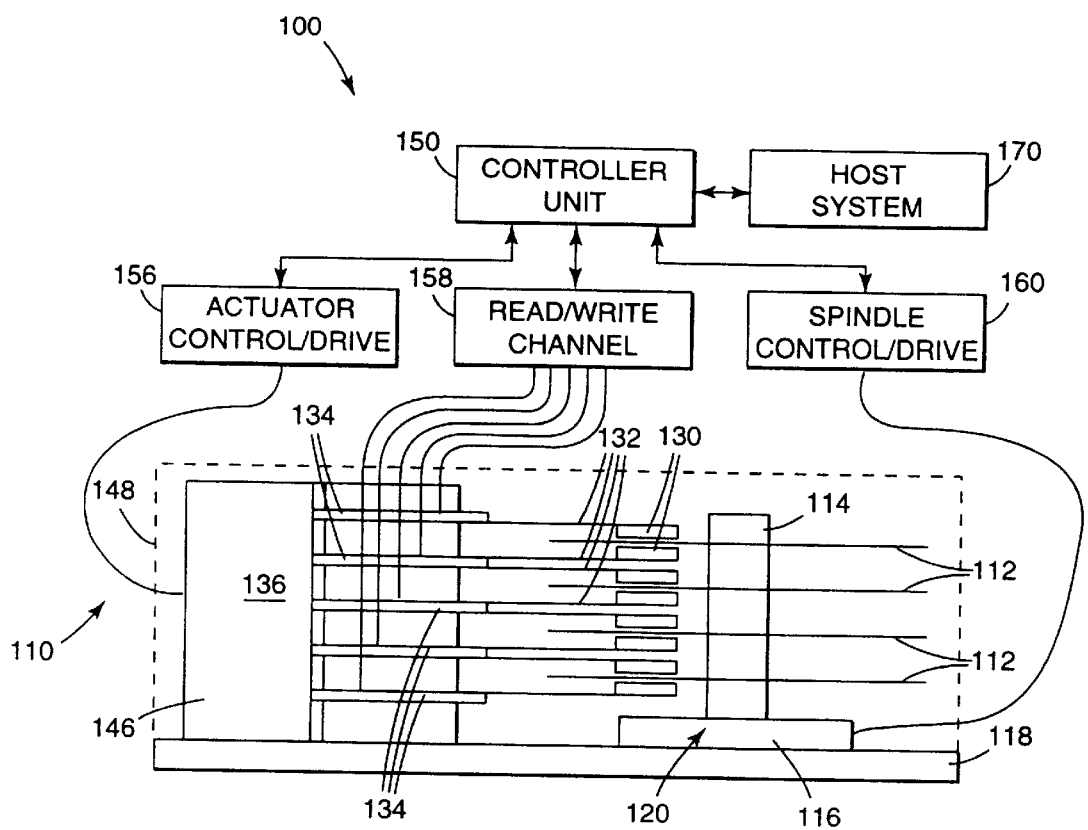
FIG. 1 shows a schematic diagram of a data storage system of the present invention.

FIG. 1 shows a schematic diagram of a data storage system of the present invention that is designated by the general reference number 100. System 100 includes a hardware plant 110. The hardware plant 110 comprises a disk assembly 120 and an actuator assembly 146. The disk assembly 120 includes a plurality of disks 112, a spindle 114, and a motor 116. However, those skilled in the art will recognize that disk assembly may only include a signal recording medium.

Each disk has a plurality of concentric data tracks. Disks 112 are mounted on the spindle motor shaft 114 which is connected to the spindle motor 116. Motor 116 is mounted to a chassis 118.

The actuator arm assembly 128 includes a plurality of sliders 130 having read/write heads are positioned over the disks 112 such that each surface of the disks 112 has a corresponding slider 130. Each slider 130 is attached to one of the plurality of suspensions 132 which in turn are attached to a plurality of actuator arms 134.

The actuator arm assemblies 128 are connected to a rotary actuator 136. Alternatively, the actuator arm assemblies 128 may be an integral part of a rotary actuator comb. Actuator 136 moves the heads in a radial direction across disks 112. Actuator 136 is mounted to chassis 118. Although a rotary actuator is shown in the preferred embodiment, a linear actuator could also be used. The actuator arm assemblies 128 including sliders 130, suspensions 132, and arms 134, and the actuator 136 comprise an actuator assembly 146. The disk stack assembly 120 and the actuator assembly 146 are sealed in an enclosure 148 (shown by dashed line) which provides protection from particulate contamination.

A controller unit 150 provides overall control to system 100. Controller unit 150 typically contains a central a processing unit (CPU), memory unit and other digital circuitry. Controller 150 is connected to an actuator drive unit 156 which in turn is connected to actuator 136. This allows controller 150 to control the movement of sliders 130 over disks 112. The controller 150 is connected to a read/write channel electronics 158 which in turn is connected to the heads of the sliders 130. This allows controller 150 to send and receive data from the disks 112. Controller 150 is also connected to a spindle control/drive unit 160 which in turn is connected to spindle motor 116. This allows controller 150 to control the rotation of disks 112.

A host system 170, which is typically a computer system, is connected to the controller unit 150. System 170 may send digital data to controller 150 to be stored disks 112, or may request that digital data be read from disks 112 and sent to the system 170.

Figure 2:
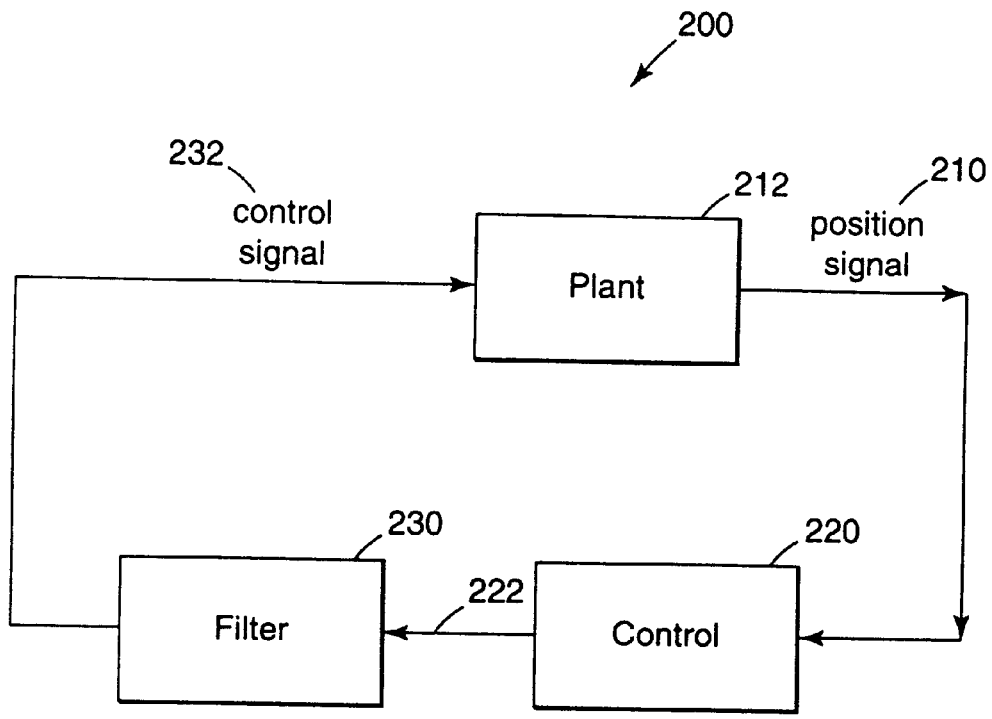
FIG. 2 illustrates a block diagram of the data storage system.

FIG. 2 illustrates a block diagram of the disk drive system 200. In FIG. 2, a position signal 210 is obtained from the plant 212. The plant 212 represents the disk drive hardware including the actuator assembly and transducers. The position signal 210 indicates the radial position of the magnetic head relative to the adjacent track and is generally designed to be zero when the head is at the center of a track being traced.

The position signal 210 is provided to a controller 220. The controller 220 calculates the number of tracks needed to be jumped according to command from a host processor unit. A control signal 222 from the controller 220 is then fed to a notch filter 230. Those skilled in the art will recognize that the notch filter may be included in the controller, the actuator drive system, or in a separate notch filter assembly. As mentioned above, the notch filter 230 is designed to remove resonant frequencies emanating from the actuator structure. The output 232 from the notch filter 230 is then provided to the plant 212 to position the transducers at the desired track.

Figure 3:
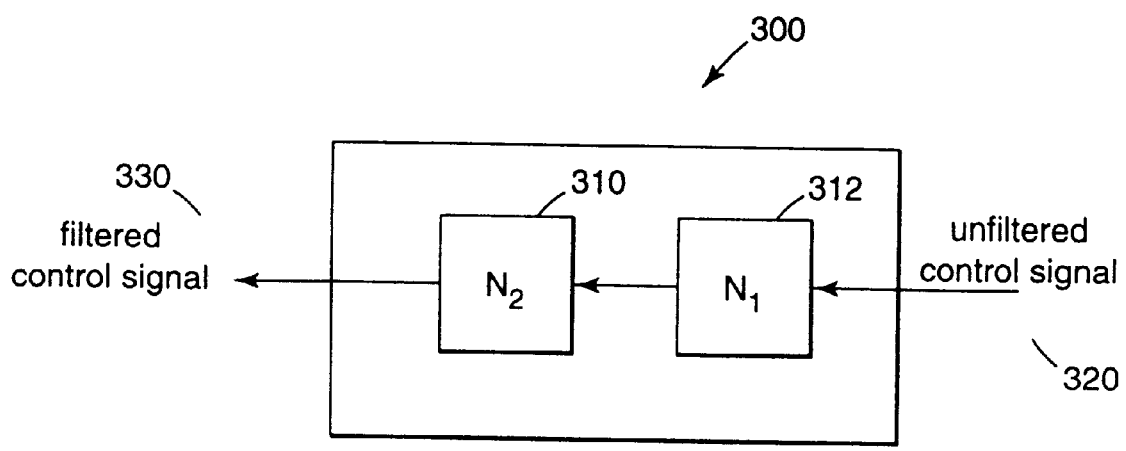
FIG. 3 illustrates a typical notch filter.

FIG. 3 illustrates a typical notch filter 300 that may be used in the disk drive system of FIG. 2. The filter 300 may include one or more notch filter elements 310, 312 in sequence. The unfiltered control signal 320 is provided as an input to the notch filter 300 and a filtered control signal 330 is generated at the output.

Figure 4:
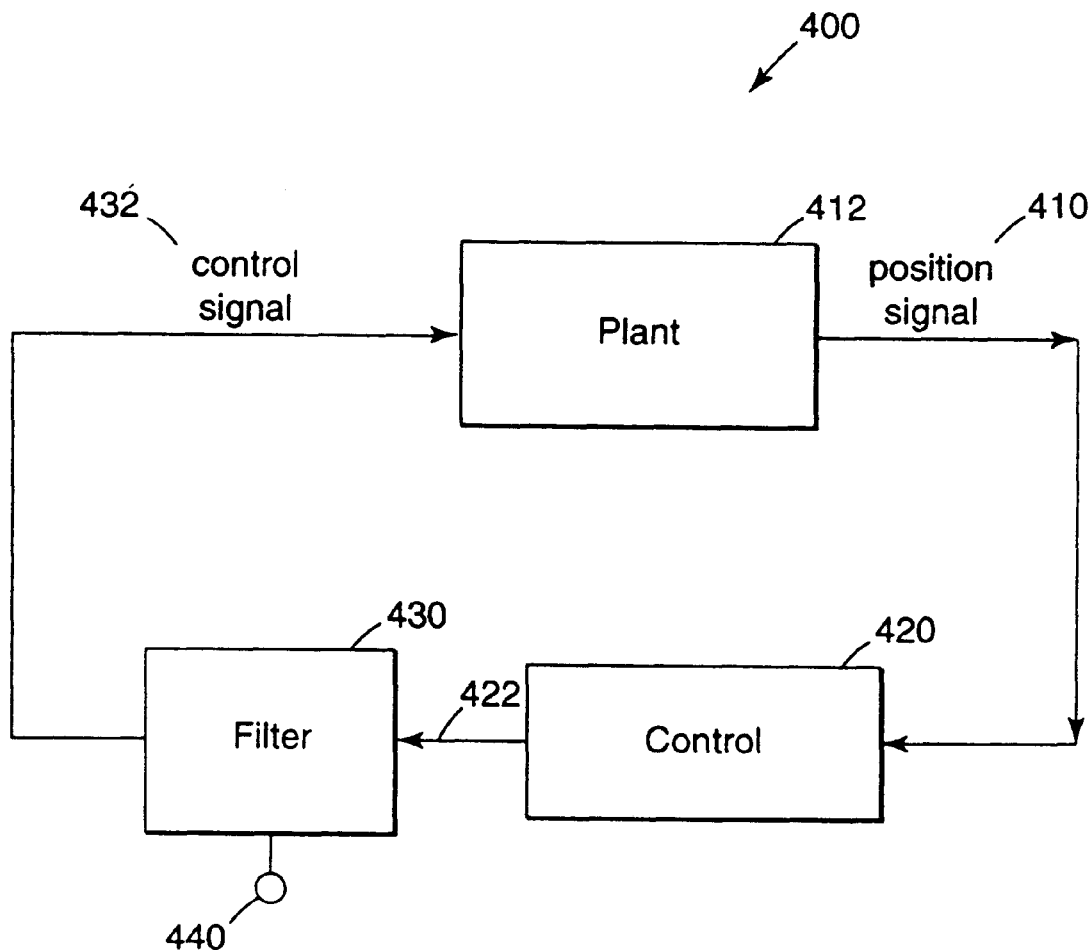
FIG. 4 illustrates a block diagram of a servo system according to the present invention.

FIG. 4 illustrates a block diagram of a disk drive system 400 according to the present invention. The block diagram of the disk drive system of the present invention is similar to the block diagram of the disk drive system illustrated in FIG. 2. In FIG. 4, a position signal 410 is obtained from the plant 412. The plant 412 represents the disk drive hardware including the actuator assembly and transducers. The position signal 410 indicates the radial position of the magnetic head relative to the adjacent track and is generally designed to be zero when the head is at the center of a track being traced.

The position signal 410 is provided to a controller 420. The controller 420 calculates the number of tracks needed to be jumped according to command from a host processor unit. A control signal 422 from the controller 420 is then fed to a notch filter 430. As mentioned above, the notch filter 430 is designed to remove resonant frequencies emanating from the actuator structure. However, the filter function provided by the notch filter 430 is selectable. The notch filter 430 in FIG. 4 also includes an input port for receiving a filter select signal 440 from a servo processor (not shown). The output from the notch filter 430 is then provided to the plant 412 to position the transducers at the desired track.

Figure 5:
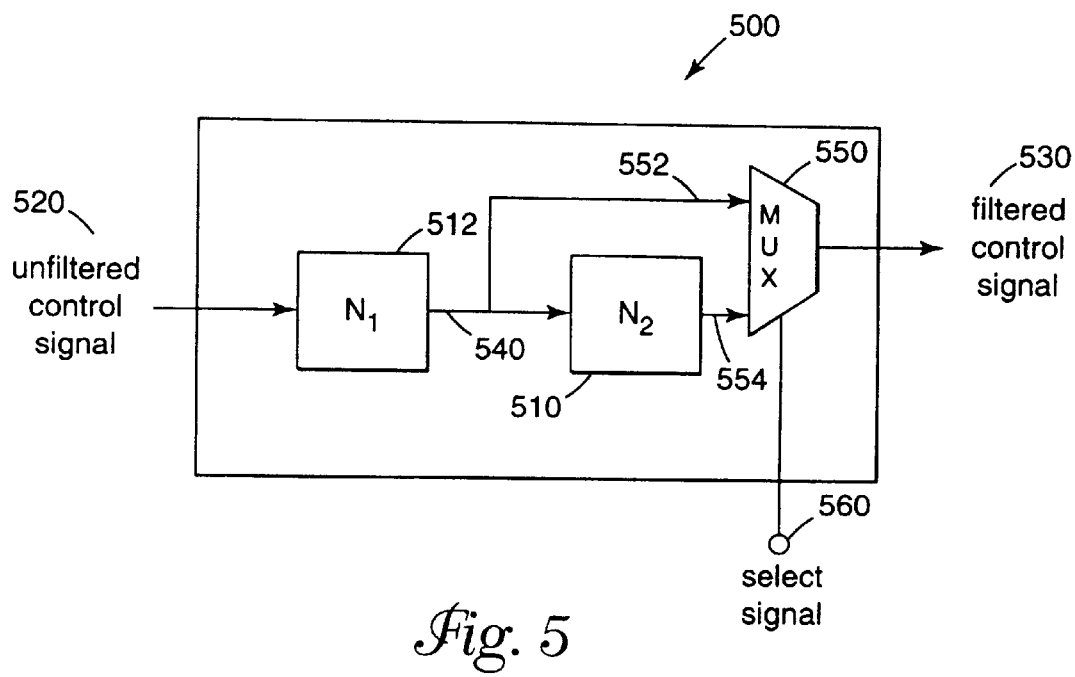
FIG. 5 illustrates one embodiment of a controllable notch filter system that is used in a servo system according to the present invention.

FIG. 5 illustrates one embodiment of a controllable notch filter system 500 that is used in a servo system of a disk drive according to the present invention. In FIG. 5, an unfiltered control signal 520 is provided to a series of notch filters 510, 512. A first notch filter 512 receives the unfiltered control signal 520 and generates a first notch filter output 514 which is provided both to the second notch filter 510 and, by way of a tap 540, to a multiplexor 550 as a first input 552. The second notch filter 510 generates a second notch filter output which is provided to a second input 554 of the multiplexor 550. The select signal 560 controls the multiplexor 550 to select which of the input signals 552, 554 at the multiplexor 550 is provided as the notch filter system output 530.

Figure 6:
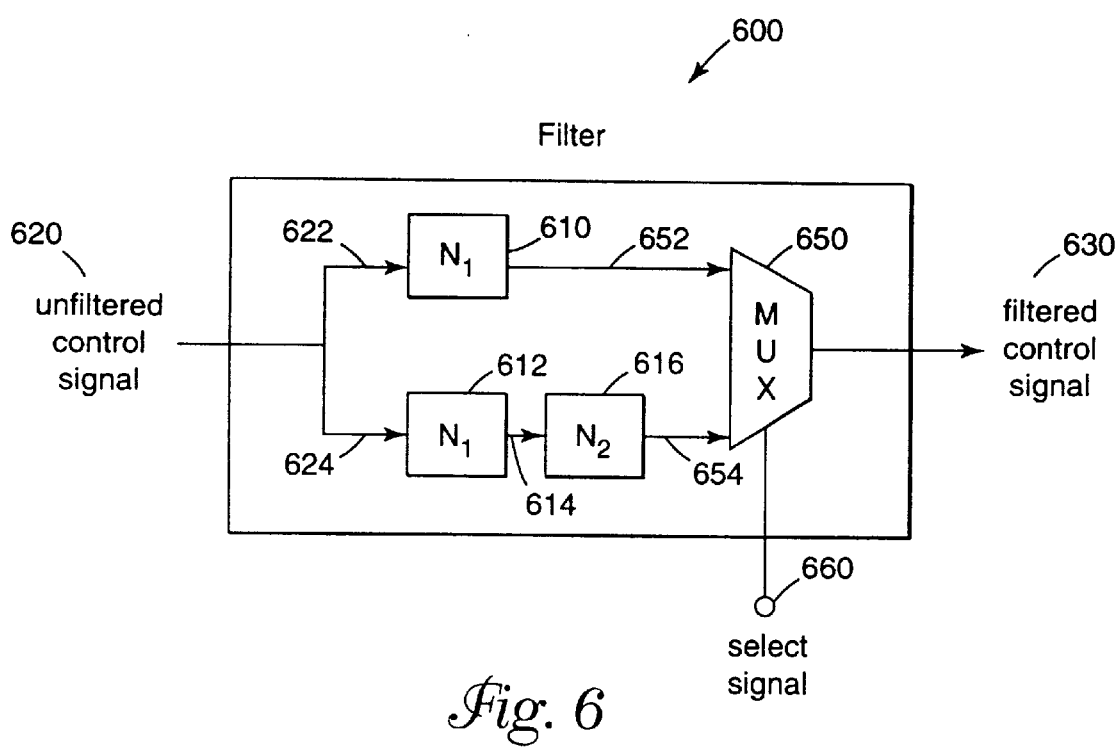
FIG. 6 illustrates a second embodiment of a controllable notch filter system that is used in a servo system according to the present invention.

Other embodiments in accordance with the present invention can be designed to provide multiple filtering to the unfiltered control signal. For example, FIG. 6 illustrates a second embodiment of a controllable notch filter system 600 that is used in a servo system of a disk drive according to the present invention. In FIG. 6, the unfiltered control signal 620 is provided to the notch filter system 600. The unfiltered control signal 620 is split to form two input signals 622, 624. The first input signal 622 is provided as an input to a first notch filter 610. The first notch filter 610 generates a first notch filter output which is then provided to a first input 652 of the multiplexor 650.

The second input signal 624 is provided to the input of a second notch filter 612. The second notch filter 612 generates an output 614 which is provided to a third notch filter 616. The output of the third notch filter 616 is provided as the second input 654 of the multiplexor 650.

Again the select signal 660 controls the multiplexor 650 to select which of the input signals 652, 654 at the multiplexor 650 is provided at the notch filter system output 630.

Thus, different servo notch filters can be provide to different heads in the actuator head stack. Accordingly, one servo notch filter may be used to remove the modes for the internal heads in the stack and a different notch filter can be used to remove the modes for the end heads. Nevertheless, those skilled in the art will recognize that the invention is not meant to be limited to the notch filters or to the method of selecting the notch filters described herein. More complex filter designs can be utilized in accordance with the teachings of the invention as long as selection of filtering is provided to remove the dominant modes for the selected head. Also, other selection devices such as switches could be used to select which notch filter should be used.

Accordingly, different servo notch filters to different heads in the actuator head stack may be selected to remove different resonant modes associated with different disk drive heads. Since the notch filters are selected by a servo control signal, the notch filters may run continuously. Therefore, initialization of the notch filters is not necessary and transients resulting from initialization are eliminated.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A notch filter system for a servo controller of a disk drive, wherein the notch filter system comprises a plurality of selectable notch filters, each of the plurality of notch filters having an output and being tuned to remove a resonant frequency associated with at least one magnetic head of the disk drive, any output of the notch filters being selectable, the selection being chosen to remove a resonant frequency associated with a magnetic head commanded to write or read data to or from the disk drive, wherein selection of the output of a Nth notch filter provides an output signal that is filtered by N notch filters.

2. The notch filter system of claim 1 further comprising a multiplexor for receiving the output from the plurality of notch filters, the multiplexor receiving commands from a servo processor to control the selection of the outputs of the notch filters.

3. The notch filter system of claim 1 wherein the plurality of notch filters comprises a series of N notch filters, the series of N notch filters providing an output from an output of the Nth notch filter and at least one output from a tap of an output of at least one of the N−1 filters.

4. The notch filter system of claim 3 further comprising a multiplexor for receiving as inputs the output of the Nth notch filter and the at least one output from a tap of an output of at least one of the N−1 notch filters, the multiplexor receiving commands from a servo processor to control the selection of the inputs.

5. The notch filter system of claim 1 wherein the notch filters are run continuously.

6. A servo control system for a disk drive, comprising:

a physical plant including an actuator and a plurality of actuator arms, movement of the actuator arms being controlled by a filtered control signal received by the physical plant, the physical plant generating a position signal and having a plurality of resonant frequency modes associated with oscillation of the plurality of actuator arms;

a servo controller, coupled to the physical plant, for receiving the position signal and generating a control signal for moving the actuator arms of the physical plant; and a notch filter system comprising a plurality of selectable notch filters, each of the plurality of notch filters having an output and being tuned to remove a resonant frequency associated with at least one magnetic head of the disk drive, any output of the notch filters being selectable, the selection being chosen to remove a resonant frequency associated with a magnetic head commanded to write or read data to or from the disk drive, wherein selection of the output of a Nth notch filter provides an output signal that is filtered by N notch filters.

7. The servo control system of claim 6 further comprising a multiplexor for receiving the output from the plurality of notch filters, the multiplexor receiving commands from a servo processor to control the selection of outputs of the notch filters.

8. The servo control system of claim 6 wherein the plurality of notch filters comprises a series of N notch filters, the series of N notch filters providing an output from an output of the Nth notch filter and at least one output from a tap of an output of at least one of the N−1 filters.

9. The servo control system of claim 8 further comprising a multiplexor for receiving as inputs the output of the Nth notch filter and the at least one output from a tap of an output of at least one of the N−1 notch filters, the multiplexor receiving commands from a servo processor to control the selection of the inputs.

10. The servo control system of claim 6 wherein the notch filters are run continuously.

11. A data storage system, comprising:

a hardware plant including an actuator assembly and a disk assembly having a recording disk, the actuator assembly moving a head relative to the disk assembly to write and read data to and from the disk assembly;

read/write channel electronics for sending and receiving data from the disk assembly;

a spindle drive unit, operatively coupled to the disk assembly, for controlling the rotations of a disk;

an actuator controller for controlling movement of the head through a succession of seek steps; and a notch filter system, operatively coupled to the actuator controller, the notch filter system comprising a plurality of selectable notch filters, each of the plurality of notch filters having an output and being tuned to remove a resonant frequency associated with at least one magnetic head of the data storage system, any output of the notch filters being selectable, the selection chosen to remove a resonant frequency associated with a magnetic head commanded to write or read data to or from the disk assembly, wherein selection of the output of a Nth notch filter provides an output signal that is filtered by N notch filters.

12. The data storage system of claim 11 wherein the notch filter further comprises a multiplexor for receiving the output from the plurality of notch filters, the multiplexor receiving commands from a servo processor to control the selection of outputs of the notch filters.

13. The data storage system of claim 11 wherein the plurality of notch filters comprises a series of N notch filters, the series of N notch filters providing an output from an output of the Nth notch filter and at least one output from a tap of an output of at least one of the N−1 filters.

14. The data storage system of claim 13 wherein the notch filter further comprises a multiplexor for receiving as inputs the output of the Nth notch filter and the at least one output from a tap of an output of at least one of the N−1 notch filters, the multiplexor receiving commands from a servo processor to control the selection of the inputs.

15. The data storage system of claim 11 wherein the notch filters are run continuously.

16. A method of removing different resonant frequencies associated with different transducers in a disk drive system, comprising the steps of:

providing a plurality of selectable notch filters, each filter receiving an unfiltered control signal, providing an output and tuned to remove a resonant frequency associated with at least one transducer; and selecting the output of the notch filter associated with a commanded transducer from said different transducers for removing the resonant frequency associated with the commanded transducer.

17. The method of claim 16 wherein the step of selecting a notch filter further comprises the steps of:

receiving output signals from the plurality of notch filters at a multiplexor; and receiving commands at the multiplexor from a servo processor to control the selection of a notch filter.

18. The method of claim 16 further comprising the step of running the notch filters continuously.

* * * * *